Sept. 1, 1931.  J. J. HOLLOWAY  1,821,436

PORTABLE POWER DRIVEN TOOL

Filed Feb. 13, 1928

Inventor

John J. Holloway

By T. Clay Lindsey

His Attorney

Patented Sept. 1, 1931

1,821,436

UNITED STATES PATENT OFFICE

JOHN J. HOLLOWAY, OF NEW BRITAIN, CONNECTICUT, ASSIGNOR TO THE STANLEY WORKS, OF NEW BRITAIN, CONNECTICUT, A CORPORATION OF CONNECTICUT

PORTABLE POWER DRIVEN TOOL

Application filed February 13, 1928. Serial No. 254,153.

This invention relates to improvements in portable power driven tools of the type having a rotary chuck and a detachable key for tightening and releasing the same and, more particularly, refers to means for holding or storing the key, when not in use, in the body or frame of the tool.

It is an object of the present invention to provide an improved and simplified arrangement whereby the key, which is employed for opening and closing the jaws of the chuck, may be very conveniently stored or retained, when not in use, in the frame or body portion of the tool.

A further aim of the invention resides in providing key holding or retaining means which will retain the key positively in place within the body of the tool during the jarring of the drill or other instrument, thus avoiding loss of the key and preserving it at all times at hand for operation of the chuck.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one of the many embodiments which the present invention may take:

Figure 1:
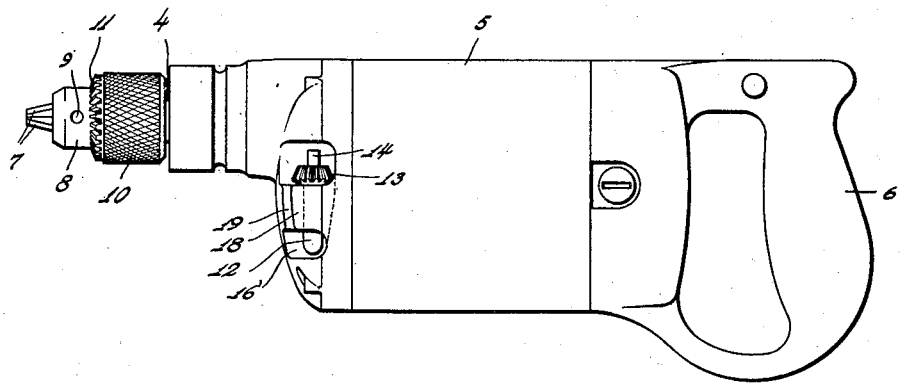
Figure 1 is a side elevational view of a portable electric drill provided with my improved key retaining means.
Figure 2:
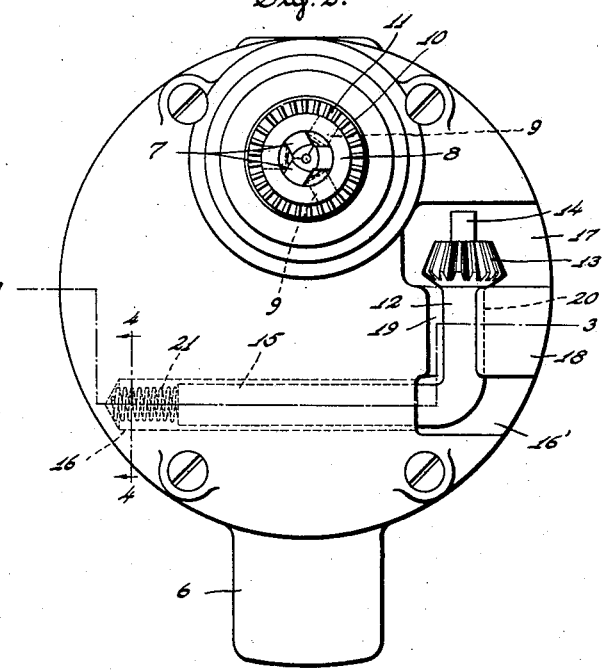
Fig. 2 is a forward end elevation of the same and on a larger scale.

Referring to the drawings in detail, my improvements are shown as incorporated in a portable electrically driven tool having a frame which includes a body portion 5 and the usual or conventional handle 6. Journalled in the body portion and extending forwardly from the forward end thereof is a spindle 4 carrying a chuck which may include a chuck body 8, chuck jaws 7 and a rotary chuck sleeve 10 having a toothed edge 11 forming, in effect, a bevel gear. The chuck body may have the usual pin receiving openings 9. The chuck jaws are adapted to grip a drill or other operating instrument.

A key for turning the chuck sleeve 10 is illustrated in the drawings as having a shank 12, a bevel pinion 13 thereon, and a pin 14 extending centrally from the bevel pinion. Extending substantially at right angles from the end of the key shank 12 is an elongated handle 15. The pin 14 is adapted to be received in a well-known manner in one of the pin receiving openings 9 in the chuck body 8 in which position the pinion 13 will mesh with the gear 11 of the sleeve, whereby, when the key is rotated by the use of the handle 15, which provides a larger leverage, the sleeve will be rotated to either open or close the chuck jaws 7.

In accordance with the present invention, the tool is provided, preferably at the forward end of the body portion 5, with means wherein the key may be retained or stored when not in use. To this end, there is provided in the front end of the body portion a transverse bore or chamber 16 closed at one end and opening into a socket or entrance groove 16' at its other end. The socket 16' is in the nature of a groove open at the forward end of the body portion and also at the periphery of the body portion. Spaced laterally from the socket 16' is a recess or pocket 17 which is open at the forward face and at the peripheral edge of the body portion. The socket 16' and the recess 17 are connected by a channel, groove or cross passage 19, the outer side wall of which has a depression or groove 20 of a shape to conform to the configuration of that portion of the key shank which is adapted to fit therein. The groove or depression 20 is in the inner face of an abutment 18.

Figure 4:
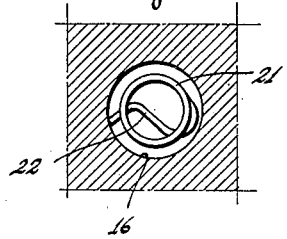
Fig. 4 is a fragmentary cross sectional view taken on line 4—4 of Fig. 2.
Figure 3:
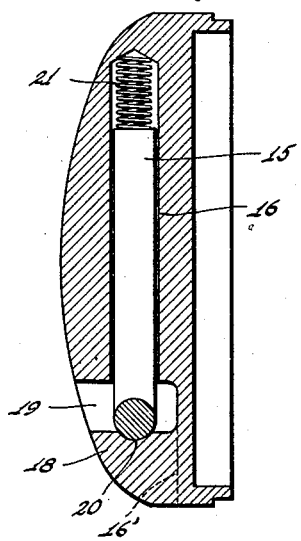
Fig. 3 is a cross sectional view taken substantially on line 3—3 of Fig. 2.

Within the inner or closed end of the chamber 16 is placed a coiled spring 21 which may be held in place within the chamber by bending the innermost coil 22 in such manner that the end of the spring will engage the periphery of the chamber, as shown in Fig. 4. The end coil 22, when inserted in the chamber, is under sufficient pressure to prevent the spring from becoming accidentally dislodged while, at the same time, the major portion of the spring is free to move in the chamber when the key is removed or inserted.

It will be observed, from the drawings, that when the key is stored in the forward end of the body portion, the handle 15 is within the chamber 16, the shank 12 engages in the depression 20, and the bevel pinion 13 is in the pocket 17. The spring, being under compression, urges the key in a direction to hold the shank 12 thereof securely in the depression 20 so that the likelihood of the key becoming acidentally displaced, due to jarring of the tool or for any other reason, is effectively guarded against. To remove the key from the holder, it is only necessary to apply sufficient pressure thereto in a direction inwardly of the chamber to enable the key shank to be disengaged from the depression 20 and then turn the key about the axis of the handle 15 as a center until the key shank is in alignment with the socket 16', whereupon the spring 21 will tend to eject the key from the body portion, or the key may be manually withdrawn. The spring 21 is of such length as to exert sufficient axial thrust on the handle to accomplish the reliable locking of the key shank in the depression 20. To restore the key in place, the reverse operations are carried out, the handle being first inserted into the chamber 16 until the shank 12 may be turned into the cross passage 19, whereupon the key is released, with the result that the spring 21 will move the key outwardly thereby engaging the shank 12 in the depression 20.

It will be observed, from the foregoing description taken in connection with the accompanying drawings, that the means for holding the key in the forward end of the body portion of the tool is very simple in construction and arrangement and adds but little expense in the manufacture of the tool. The openings and recesses in which the key is stored may be, for the most part, cast in the tool frame at the time of its manufacture. The spring 21, which is the only additional element, is relatively inexpensive. The key is conveniently stored adjacent the chuck and may be taken from and inserted in place very quickly and with facility.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A frame for a portable power driven rotary tool having a chuck; a key with a pinion, a shank and a handle extending at an angle from the shank; said frame having a chamber to receive the handle, a cross-passage to receive the shank and a recess to receive the pinion; said recess and cross-passage opening through the face of the frame, and the chamber opening through an edge and partially through said face; said frame also having at the outer side of the cross-passage an abutment provided with a depression; and a spring in the chamber to engage the handle to urge the shank yieldably into the depression.

2. In a portable tool having a rotary chuck with gear teeth thereon and a socket adjacent the gear teeth, said tool having a chamber and a recess spaced from the chamber and a cross passage connecting one end portion of the recess with the chamber, said recess having a depression in one wall thereof, said recess, cross passage and adjacent end of said chamber all opening through the face of the portable tool and said chamber opening at its end through the side of the portable tool, a handled key for operating the chuck having a handle adapted to removably enter said chamber by longitudinal movement of the handle, a shank on said key extending at an angle to said handle and adapted to be rotated through the open face into the cross passage and for fitting into said depression, a gear and a tang on said shank adapted to occupy said recess, said tang adapted to fit within the socket of the chuck, and the gear wheel adapted to mesh with the teeth of the chuck, and spring means in said chamber for engaging said handle for urging the shank into the depression.

3. In combination, a frame for a power driven tool having a bore closed at one end and open at its other end and a cavity adjacent the open end of said bore, said cavity having a side wall extending substantially at right angles to the length of said bore and facing towards the closed end of the bore, said side wall having a depression; a right angled key having a handle adapted to be removed from and to extend into said bore and having a shank provided with a gear; the shank end of the handle being adapted to be received by said cavity and engage in the depression of said wall; and a spring in said bore adapted to press against the end of the handle of the key so as to urge the shank end thereof against said wall.

4. In combination, a portable power driven tool having a frame and a chuck; said frame having at its forward end a bore, an entrance groove at one end thereof, a recess and a cross-passage connecting the entrance groove and recess; said frame having a wall between said entrance groove and recess and provided with a locking depression; a key having a handle adapted to be inserted through said entrance groove into said bore, a shank at right angles to said handle and adapted to engage in said locking depression, and a gear adapted to occupy said recess; and a spring in said bore, adapted to press against said handle and urge said shank into said locking depression.

JOHN J. HOLLOWAY.